United States Patent
Lee et al.

(10) Patent No.: US 10,251,113 B2
(45) Date of Patent: Apr. 2, 2019

(54) APPARATUS AND METHOD FOR PROVIDING SERVICE IN WIRELESS COMMUNICATION SYSTEM

(71) Applicant: Samsung Electronics Co., Ltd., Gyeonggi-do (KR)

(72) Inventors: Min-Gyu Lee, Gyeonggi-do (KR); Se-Hee Han, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/895,505

(22) Filed: Feb. 13, 2018

(65) Prior Publication Data
US 2018/0234904 A1  Aug. 16, 2018

(30) Foreign Application Priority Data
Feb. 13, 2017 (KR) .................. 10-2017-0019646

(51) Int. Cl.
*H04W 36/00* (2009.01)
*H04W 36/32* (2009.01)
(Continued)

(52) U.S. Cl.
CPC .......... *H04W 36/32* (2013.01); *H04W 4/027* (2013.01); *H04W 4/029* (2018.02); *H04W 4/44* (2018.02);
(Continued)

(58) Field of Classification Search
CPC ..... H04W 36/32; H04W 4/027; H04W 4/029; H04W 36/08; H04W 4/44; H04W 4/70; H04W 88/08
(Continued)

(56) References Cited

U.S. PATENT DOCUMENTS

| | | | |
|---|---|---|---|
| 2005/0259619 A1 | 11/2005 | Boettle et al. | |
| 2015/0264614 A1* | 9/2015 | Stager | H04W 36/0061 370/332 |
| 2017/0041916 A1 | 2/2017 | Soret et al. | |

FOREIGN PATENT DOCUMENTS

| | | |
|---|---|---|
| KR | 101549114 | 9/2015 |
| WO | WO 2017/014514 | 1/2017 |

OTHER PUBLICATIONS 802.11ai: IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 1: Fast Initial Link Setup (Year: 2016).*

(Continued)

*Primary Examiner* — Ronald Eisner
(74) *Attorney, Agent, or Firm* — The Farrell Law Firm, P.C.

(57) ABSTRACT

Disclosed is a sensor network, machine type communication (MTC), machine-to-machine (M2M) communication, and technology for Internet of Things (IoT), and is applicable to intelligent services such as smart home, smart building, smart city, smart car, connected car, health care, digital education, smart retail, security and safety services. An access point (AP) includes a controller that generates a neighbor AP information message including location information of neighbor APs, and a transmitter that transmits the neighbor AP information message including a field indicating that a type of a currently transmitted message includes location information, a length field indicating a length of fields located after the length field in the currently transmitted message, and a location information field indicating location information of each of the neighbor APs.

7 Claims, 13 Drawing Sheets

(51) Int. Cl.
    *H04W 4/70*   (2018.01)
    *H04W 4/44*   (2018.01)
    *H04W 4/02*   (2018.01)
    *H04W 36/08*  (2009.01)
    *H04W 4/029*  (2018.01)
    *H04W 88/08*  (2009.01)

(52) U.S. Cl.
    CPC ............ *H04W 4/70* (2018.02); *H04W 36/08* (2013.01); *H04W 88/08* (2013.01)

(58) Field of Classification Search
    USPC .......................... 455/436–444; 370/321–334
    See application file for complete search history.

(56) References Cited

OTHER PUBLICATIONS

Andre B. Reis et al., "Parked Cars are Excellent Roadside Units", Jun. 1, 2016, 12 pages.
International Search Report dated May 14, 2018 issued in counterpart application No. PCT/KR2018/001714, 9 pages.
LV, Pin et al., SWIMMING: Seamless and Efficient WiFi-Based Internet Access from Moving Vehicles, IEEE Transactions on Mobile Computing . . . vol. 14, No. 5, May 2015, Copyright 2014 IEEE, pp. 1085-1097.

* cited by examiner

| Location | BSSID (conditional) | Short-SSID (conditional) |
|---|---|---|

Octets: variable | 0 or 6 | 0 or 4

FIG.12

| Location /Latitude | Location /Longitude | BSSID (conditional) | Short-SSID (conditional) |
|---|---|---|---|

Octets: 4 or variable | 4 or variable | 0 or 6 | 0 or 4

FIG.13

| Element ID | Length | Location | Direction (optional) | Velocity (optional) | Optional Information |
|---|---|---|---|---|---|

Octets: 1 | 1 | variable | variable | variable | variable

FIG.14

APPARATUS AND METHOD FOR PROVIDING SERVICE IN WIRELESS COMMUNICATION SYSTEM

PRIORITY

This application claims priority under 35 U.S.C. § 119(a) to a Korean Patent Application filed in the Korean Intellectual Property Office on Feb. 13, 2017 and assigned Serial No. 10-2017-0019646, the contents of which are incorporated herein by reference.

BACKGROUND

1. Field of the Disclosure

The present disclosure relates generally to an apparatus and method for providing a service in a wireless communication system, and more particularly, to an apparatus and method for providing a service in a wireless communication system supporting a vehicle to infrastructure (V2I) scheme.

2. Description of the Related Art

The Internet, which is a human centered connectivity network where humans generate and consume information, is now evolving to the internet the internet of things (IoT) where distributed entities, such as things, exchange and process information without human intervention. The internet of everything (IoE), which is a combination of the IoT technology and the big data processing technology through connection with a cloud server, has emerged.

As technology elements, such as sensing technology, wired/wireless communication and network infrastructure, service interface technology, and security technology have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Generally, in a V2I scheme, a vehicle is accessed to an infrastructure including a server, through a wireless communication, so a communication between a station (STA) located at the vehicle and a service may be supported. For example, in the V2I scheme, a wireless communication between a vehicle and an access point (AP) such as a road side unit (RSU) deployed at a road side is supported.

The V2I scheme has been used for a vehicle to provide a multimedia service, a vehicle management system, an infotainment service such as a banking service, and the like.

FIG. 1 illustrates a structure of a wireless communication system supporting a conventional V2I scheme.

Referring to FIG. 1, the wireless communication system includes a server 111, a plurality of RSUs, e.g., RSU 1 121, RSU 2 122, and RSU 3 123, and a plurality of STAs, e.g., a STA 1 131 and a STA 2 132. Each of STA 1 131 and STA 2 132 may be mounted on a vehicle, or located inside or outside of the vehicle.

STA 1 131 communicates with RSU 2 122 based on a V2I scheme, and communicates with STA 2 132 based on a vehicle-to-vehicle (V2V) scheme.

RSU 1 121, RSU 2 122, and RSU 3 123 use different frequencies. That is, RSU 1 121 uses a frequency 1, RSU 2 122 uses a frequency 2, and RSU 3 123 uses a frequency 3.

An infotainment service has been rapidly developed, causing a need in the V2I scheme for a Wi-Fi based-RSU in which traffic load is easily distributed and which may be implemented at a relatively low cost.

The V2I scheme needs to provide a service to a moving vehicle, which renders handoff as an important issue in the V2I scheme. Since a service coverage radius of RSU is relatively small, a vehicle frequently moves among RSUs and service delay and resource waste due to a handoff regularly occurs.

Accordingly, there is a need in the art for providing a service such that a vehicle may perform an effective handoff in a wireless communication system supporting a V2I scheme.

SUMMARY

An aspect of the present disclosure is to address at least the above-mentioned problems and/or disadvantages and to provide at least the advantages described below. Accordingly, an aspect of the present disclosure is to provide an apparatus and method for providing a service in a wireless communication system supporting a V2I scheme.

Another aspect of the present disclosure is to provide an apparatus and method for providing a service thereby performing an effective handoff in a wireless communication system supporting a V2I scheme.

Another aspect of the present disclosure is to provide an apparatus and method for providing a service thereby decreasing a handoff frequency in a wireless communication system supporting a V2I scheme.

Another aspect of the present disclosure is to provide an apparatus and method for providing a service thereby decreasing a time required for a handoff in a wireless communication system supporting a V2I scheme.

Another aspect of the present disclosure is to provide an apparatus and method for providing a service thereby decreasing collision among acknowledgement (ACK) messages when a plurality of RSUs use the same basic service set identifier (BSSID) in a wireless communication system supporting a V2I scheme.

Another aspect of the present disclosure is to provide an apparatus and method for providing a service based on at least one of location information of at least one RSU and location information of a vehicle in a wireless communication system supporting a V2I scheme.

Another aspect of the present disclosure is to provide an apparatus and method for providing a service thereby decreasing RSUs to be scanned in a wireless communication system supporting a V2I scheme.

In accordance with an aspect of the present disclosure, an operating method of an access point (AP) in a wireless communication system supporting a V2I scheme includes generating a neighbor AP information message including location information of each of neighbor APs, and transmitting the neighbor AP information message, wherein the neighbor AP information message includes a field indicating that a type of a currently transmitted message includes location information, a length field indicating a length of fields located after the length field in the currently transmitted message, and a location information field indicating location information of each of the neighbor APs.

In accordance with another aspect of the present disclosure, an operating method of a station (STA) in a wireless communication system supporting a V2I scheme, includes generating a neighbor AP information request message including location information of the STA, and transmitting the neighbor AP information request message to an AP, wherein the neighbor AP information request message includes a field indicating that a type of a currently transmitted message includes location information, a length field indicating a length of fields located after the length field in the currently transmitted message, and a location information field indicating location information of the STA.

In accordance with another aspect of the present disclosure, an operating method of an AP in a wireless communication system supporting a V2I scheme includes generating a neighbor AP information message including location information of each of neighbor APs, and transmitting the neighbor AP information message, wherein the neighbor AP information message includes a location information header field and location information fields indicating location information of the neighbor APs, and wherein the location information header field includes information related to a number of the location information fields and a length of each of the location information fields.

In accordance with another aspect of the present disclosure, an operating method of a STA in a wireless communication system supporting a V2I scheme includes generating a neighbor AP information request message including location information of the STA, and transmitting the neighbor AP information request message to an AP, wherein the neighbor AP information request message includes an identifier indicating that a currently transmitted message requests neighbor AP information, a length field indicating a length of fields located after the length field in the currently transmitted message, and a location information field indicating location information of the STA.

In accordance with another aspect of the present disclosure, an operating method of a STA in a wireless communication system supporting a V2I scheme includes receiving a neighbor AP information message including location information of neighbor APs from an AP, selecting neighbor APs to be scanned by the STA among the neighbor APs based on the location information of the neighbor APs, and performing a scan process on the selected neighbor APs, wherein the neighbor AP information message includes a field indicating that a type of a currently transmitted message includes location information, a length field indicating a length of fields located after the length field in the currently transmitted message, and a location information field indicating location information of each of the neighbor APs.

In accordance with another aspect of the present disclosure, an AP in a wireless communication system supporting a V2I) scheme includes a controller configured to generate a neighbor AP information message including location information of each of neighbor APs, and a transmitter configured to transmit the neighbor AP information message, wherein the neighbor AP information message includes a field indicating that a type of a currently transmitted message includes location information, a length field indicating a length of fields located after the length field in the currently transmitted message, and a location information field indicating location information of each of the neighbor APs.

In accordance with another aspect of the present disclosure, a STA in a wireless communication system supporting a V2I scheme includes a controller configured to generate a neighbor AP information request message including location information of the STA, and a transmitter configured to transmit the neighbor AP information request message to an AP, wherein the neighbor AP information request message includes a field indicating that a type of a currently transmitted message includes location information, a length field indicating a length of fields located after the length field in the currently transmitted message, and a location information field indicating location information of the STA.

In accordance with another aspect of the present disclosure, an AP in a wireless communication system supporting a V2I scheme includes a controller configured to generate a neighbor AP information message including location information of each of neighbor APs, and a transmitter configured to transmit the neighbor AP information message, wherein the neighbor AP information message includes a location information header field and location information fields indicating location information of the neighbor APs, and wherein the location information header field includes information related to a number of the location information fields and a length of each of the location information fields.

In accordance with another aspect of the present disclosure, a STA in a wireless communication system supporting a V2I scheme includes a controller configured to generate a neighbor AP information request message including location information of the STA, and a transmitter configured to transmit the neighbor AP information request message to an AP, wherein the neighbor AP information request message includes an identifier indicating that a currently transmitted message requests neighbor AP information, a length field indicating a length of fields located after the length field in the currently transmitted message, and a location information field indicating location information of the STA.

In accordance with another aspect of the present disclosure, a STA in a wireless communication system supporting a V2I scheme includes a transmitter; a receiver configured to receive a neighbor AP information message including location information of neighbor APs from an AP, and a controller configure to select neighbor APs to be scanned by the STA among the neighbor APs based on the location information of the neighbor APs, wherein the transmitter and the receiver are configured to perform a scan process on the selected neighbor APs, and wherein the neighbor AP information message includes a field indicating that a type of a currently transmitted message includes location information, a length field indicating a length of fields located after the length field in the currently transmitted message, and a location information field indicating location information of each of the neighbor APs.

BRIEF DESCRIPTION OF THE DRAWINGS

The above and other aspects, features and advantages of certain embodiments of the present disclosure will be more apparent from the following description taken in conjunction with the accompanying drawings, in which:

FIG. 12 illustrates an example of a format of a location information field included in a neighbor RSU information message in a wireless communication system supporting a V2I scheme according to an embodiment of the present disclosure;

FIG. 13 illustrates another example of a format of a location information field included in a neighbor RSU information message in a wireless communication system supporting a V2I scheme according to an embodiment of the present disclosure;

FIG. 14 illustrates an example of a format of a neighbor AP information request message in a wireless communication system supporting a V2I scheme according to an embodiment of the present disclosure;

Throughout the drawings, it should be noted that like reference numbers are used to depict the same or similar elements, features, and structures.

DETAILED DESCRIPTION

Figure 1:
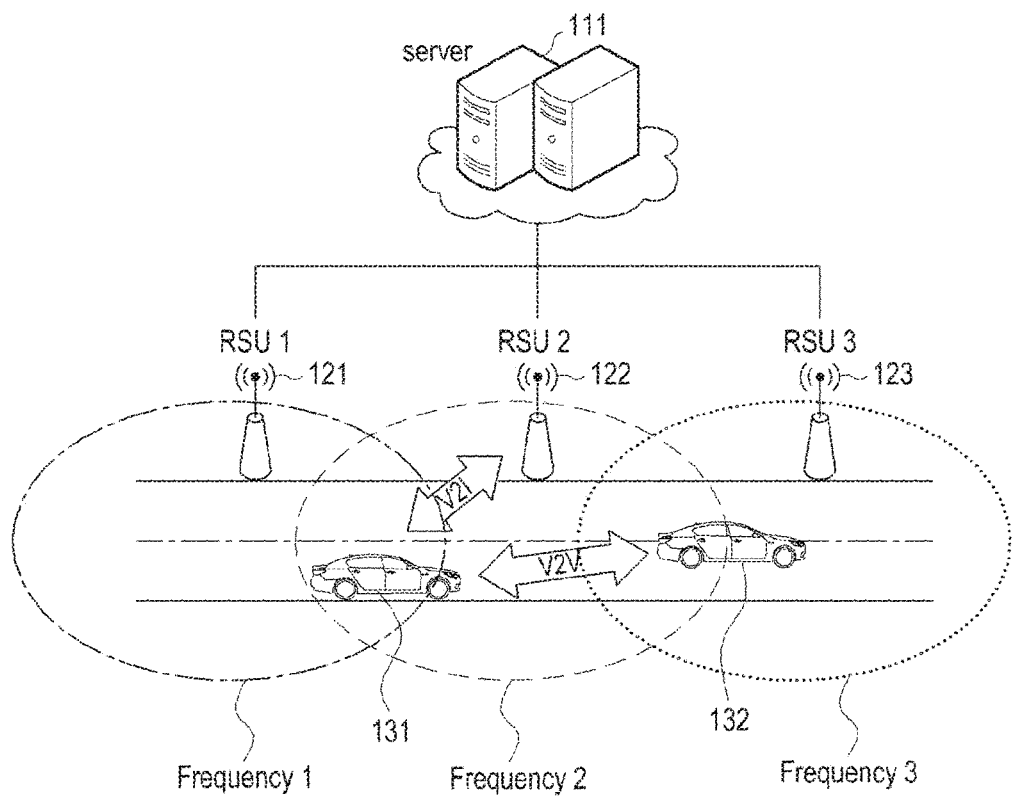
FIG. 1 illustrates a structure of a wireless communication system supporting a conventional V2I scheme.

The following description with reference to the accompanying drawings is provided to assist in a comprehensive understanding of embodiments of the present disclosure, including various specific details of examples to assist in that understanding. Accordingly, those of ordinary skill in the art will recognize that various changes and modifications of the embodiments described herein can be made without departing from the scope and spirit of the present disclosure. In addition, descriptions of well-known functions and constructions may be omitted for the sake of clarity and conciseness.

The terms and words used in the following description and claims are not limited to their dictionary meanings, but are merely used to enable a clear and consistent understanding of the present disclosure. Accordingly, it should be apparent to those skilled in the art that the following description of embodiments of the present disclosure is provided for illustration purposes only and not for limiting the present disclosure.

It is to be understood that the singular terms "a," "an," and "the" include plural referents unless the context clearly dictates otherwise. Thus reference to "a component surface" includes reference to one or more of such surfaces.

Although ordinal numbers such as "first" and "second" will be used to describe various components, those components are not limited herein. The terms are used only for distinguishing one component from another component. For example, a first component may be referred to as a second component and likewise, a second component may also be referred to as a first component, without departing from the scope of the present disclosure. The expression "and/or" used herein includes any and all combinations of one or more of the associated listed items.

The terms "include" and "comprise," as well as derivatives thereof, indicate inclusion without limitation, "or," is inclusive, meaning and/or, the phrases "associated with" and "associated therewith" as well as derivatives thereof, may indicate to include, be included within, interconnect with, contain, be contained within, connect to or with, couple to or with, be communicable with, cooperate with, interleave, juxtapose, be proximate to, be bound to or with, have, and have a property of, and "controller" indicates any device, system or part thereof that controls at least one operation, and such a device may be implemented in hardware, firmware or software, or some combination of at least two of the same.

It should be noted that the functionality associated with any particular controller may be centralized or distributed, whether locally or remotely. Definitions for certain words and phrases are provided throughout this specification, and those of ordinary skill in the art should understand that in many, if not most instances, such definitions apply to prior, as well as future uses of such defined words and phrases.

The terminology used herein is for the purpose of describing embodiments only and is not intended to be limiting. As used herein, the singular forms are intended to include the plural forms as well, unless the context clearly indicates otherwise. It will be further understood that the terms "comprises" and "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to embodiments of the present disclosure, an electronic device may include a communication functionality, and may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, and a wearable device, such as a head-mounted device (HMD), electronic clothes, electronic braces, an electronic necklace, an electronic appcessory, an electronic tattoo, or a smart watch.

An electronic device may be a smart home appliance with communication functionality, such as a television, a digital video disk (DVD) player, an audio, a refrigerator, an air conditioner, a vacuum cleaner, an oven, a microwave oven, a washer, a dryer, an air purifier, a set-top box, a TV box, such as Samsung HomeSync™, Apple TV™, or Google TV™, a gaming console, an electronic dictionary, an electronic key, a camcorder, and an electronic picture frame.

An electronic device may be a medical device, such as magnetic resonance angiography (MRA) device, a magnetic resonance imaging (MRI) device, computed tomography (CT) device, an imaging device, or an ultrasonic device, a navigation device, a global positioning system (GPS) receiver, an event data recorder (EDR), a flight data recorder (FDR), an automotive infotainment device, a naval electronic device, such as naval navigation device, gyroscope, or compass, an avionic electronic device, a security device, and an industrial or consumer robot.

An electronic device may be furniture, part of a building/structure, an electronic board, electronic signature receiving device, a projector, and various measuring devices, such as water, electricity, gas or electro-magnetic wave measuring devices that include communication functionality.

An electronic device may be any combination of the foregoing devices, but is not limited to the foregoing devices.

A signal transmitting apparatus or a signal receiving apparatus may be a station (STA) and interchangeable with a transmitting apparatus, a signal receiving apparatus may be interchangeable with a receiving apparatus, and the STA may be interchangeable with a mobile station (MS), user equipment (UE), device, or subscriber station.

A signal transmitting apparatus or a signal receiving apparatus may be a road side unit (RSU), which may be interchangeable with a node B, evolved node B (eNB), AP, or base station (BS).

Embodiments of the present disclosure disclose an apparatus and method in a wireless communication system supporting a V2I scheme, for providing a service thereby performing an effective handoff, decreasing a handoff frequency, decreasing a time required for a handoff, and decreasing collision among ACK messages when a plurality of RSUs use the same BSSID.

An embodiment of the present disclosure discloses an apparatus and method for providing a service in a wireless communication system supporting a V2I scheme, based on at least one of location information of at least one RSU and of a vehicle, and for decreasing RSUs to be scanned.

An apparatus and method disclosed in embodiments of the present disclosure may be applied to various communication systems, such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system in $3^{rd}$ generation partnership project 2 (3GPP2), a wideband code division multiple access (WCDMA) mobile communication system in 3GPP2, a code division multiple access (CDMA) mobile communication system in 3GPP2, an Institute of Electrical and Electronics Engineers (IEEE) 802.16m communication system, an IEEE 802.16e communication system, an evolved packet system (EPS), and a mobile internet protocol (mobile IP) system, a digital video broadcast system, such as a mobile broadcast service including a digital multimedia broadcasting (DMB) service, a digital video broadcasting-handheld (DVP-H), an advanced television systems committee-mobile/handheld (ATSC-M/H) service, and an internet protocol television (IPTV), and a moving picture experts group (MPEG) media transport (MMT) system.

In an embodiment of the present disclosure, it will be assumed that a wireless communication system supports a V2I scheme based on at least one of an Optimized Connectivity Experience (OCE) standard of Wi-Fi Alliance® Technical Task Group and an IEEE 802.11ai standard, or may be based on other standard as well as an OCE standard of Wi-Fi Alliance® Technical Task Group and an IEEE 802.11ai standard.

Figure 2:
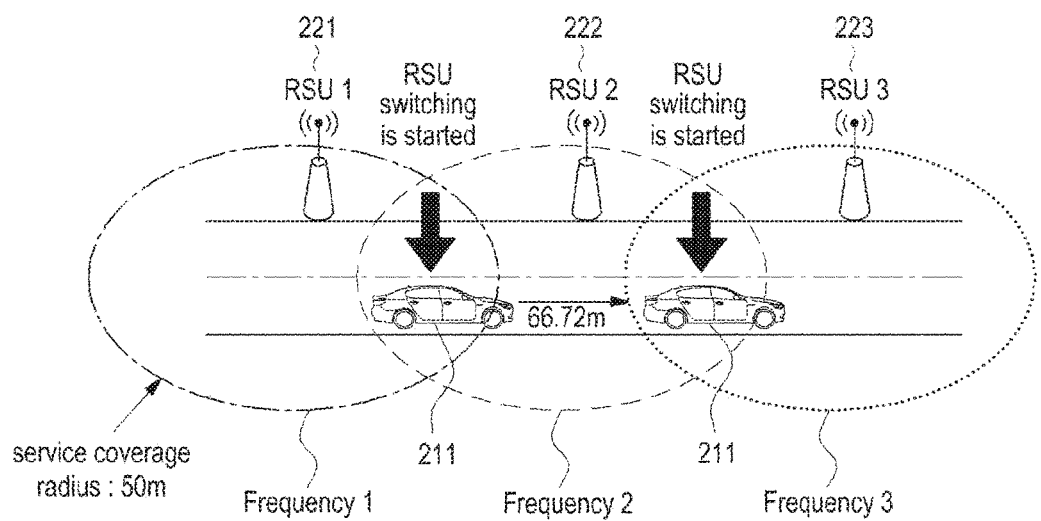
FIG. 2 illustrates an example of a handoff process in a wireless communication system supporting a V2I scheme according to an embodiment of the present disclosure.

FIG. 2 illustrates an example of a handoff process in a wireless communication system supporting a V2I scheme according to an embodiment of the present disclosure.

Referring to FIG. 2, it will be assumed that the wireless communication system supports a V2I scheme which is based on a Wi-Fi scheme supporting a plurality of channels, e.g., 39 channels including 13 2.4 GHz channels and 26 5 GHz channels. A scan time required per channel may be 60 ms, but is not limited thereto.

When a STA performs a handoff process due to a change in RSU, a channel scan time of 2.34 seconds (39×60 ms) is required. If RSU deployment density is increased for enhancing a service coverage, a handoff count is increased. As a speed of a vehicle at which the STA is located increases, the handoff count increases.

Figure 3:
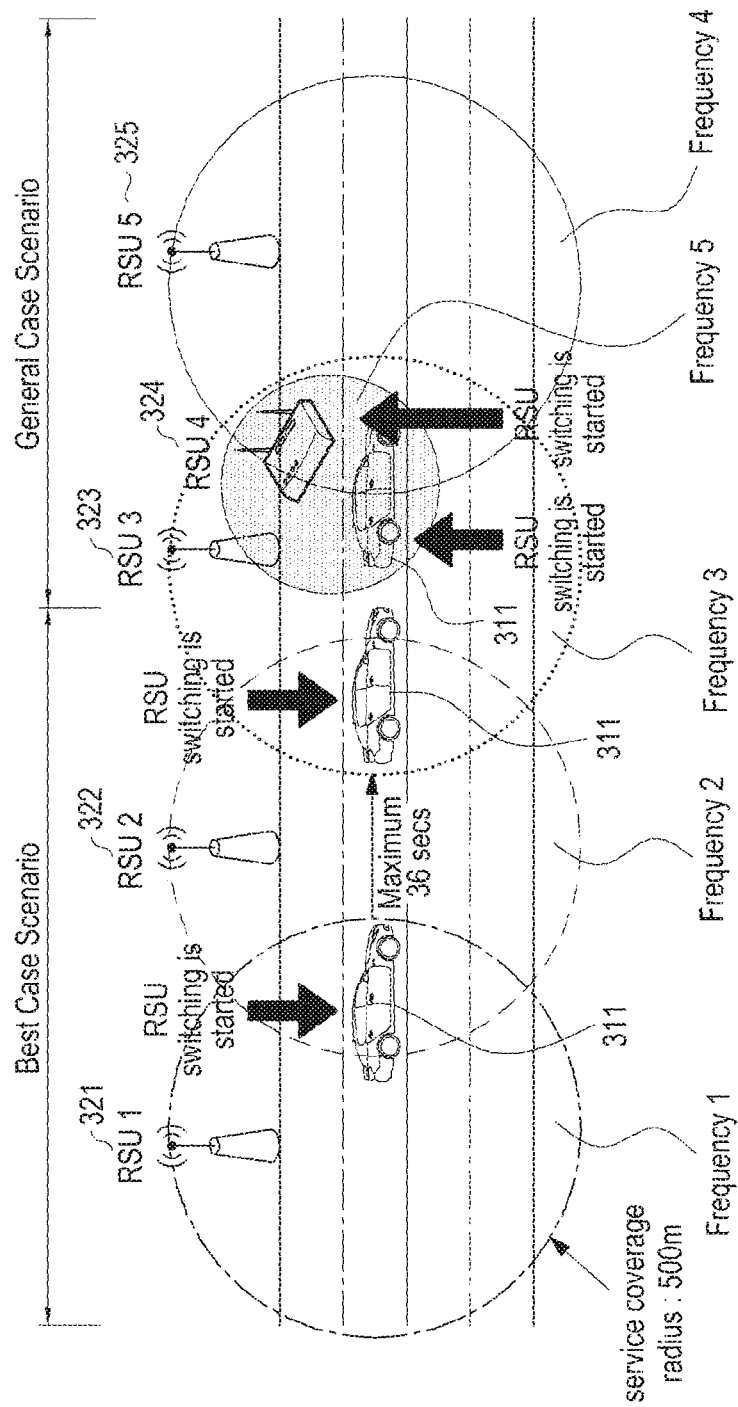
FIG. 3 illustrates another example of a handoff process in a wireless communication system supporting a V2I scheme according to an embodiment of the present disclosure.

A handoff process when a STA 211 moves through three RSUs, e.g., RSU 1 221, RSU 2 222, and RSU 3 223 is illustrated in FIG. 3. It will be assumed that a service coverage radius of each of RSU 1 221, RSU 2 222, and RSU 3 223 is 50 m, and that RSUs use a frequency 1, a frequency 2, and a frequency 3, respectively. A handoff process in FIG. 2 is a handoff process when STA 211 moves at a speed of 100 km/h, i.e., when STA 211 moves about 27.8 meters per second. In this case, STA 211 needs to perform two handoff processes due to a change in RSU, so a channel scan time of 4.68 seconds (2×39×60 ms) is required.

In this case, service quality of a service provided by the wireless communication system is degraded due to the channel scan time of 4.68 seconds. So, if a speed of a vehicle and RSU density are relatively high, a handoff process in which all channels are scanned degrades service quality of the wireless communication system.

FIG. 3 illustrates another example of a handoff process in a wireless communication system supporting a V2I scheme according to an embodiment of the present disclosure.

Referring to FIG. 3, it will be assumed that the wireless communication system supports a V2I scheme which is based on a Wi-Fi scheme supporting a plurality of channels, e.g., 39 channels including 13 2.4 GHz channels and 26 5 GHz channels. A scan time required per channel may be 60 ms.

When a STA performs a handoff process due to a change in RSU, a channel scan time of 2.34 seconds (39×60 ms) is required. If RSU deployment density is increased for enhancing a service coverage, a handoff count is increased. As a speed of a vehicle at which the STA is located increases, the handoff count increases.

A handoff process when a STA 311 moves through five RSUs, e.g., RSU 1 321, RSU 2 322, RSU 3 323, RSU 4 324, and RSU 5 325 is illustrated in FIG. 3. It will be assumed that a service coverage radius of each RSU is 50 m. A service coverage radius of RSU 4 324 is less than the service coverage radius of each of RSU 1 321, RSU 2 322, RSU 3 323, and RSU 5 325.

A handoff process in FIG. 3 is when STA 311 moves at a speed of 100 km/h, i.e., when STA 311 moves about 27.8 meters per second. In this case, STA 311 needs to perform four handoff processes due to a change in an RSU.

However, each RSU has a sizeable service coverage radius, so a handoff count in the handoff process in FIG. 3 is decreased compared with a handoff count in the handoff process in FIG. 2. That is, it will be understood that a service coverage radius of each RSU is increased ten times compared to a handoff process in FIG. 2, thereby decreasing a handoff count.

Nevertheless, a vehicle moving at a high rate of speed causes handoff to frequently occur, thereby decreasing service quality of a service provided by the wireless communication system. Specifically, when an RSU is not intentionally deployed near a road, or there are numerous private RSUs in an area, a handoff frequently occurs.

So, even though an RSU service coverage radius is increased, a handoff process in which all channels are scanned degrades service quality of the wireless communication system if a speed of a vehicle is relatively high and RSU density is relatively high.

Figure 4:
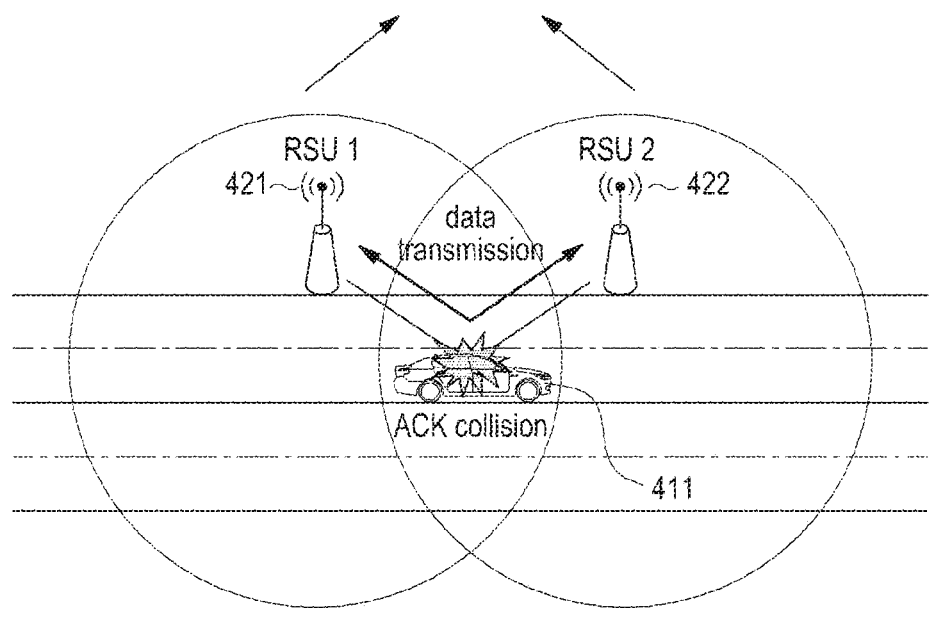
FIG. 4 illustrates a collision issue of an ACK message in a wireless communication system supporting a V2I scheme according to an embodiment of the present disclosure.
Figure 4:
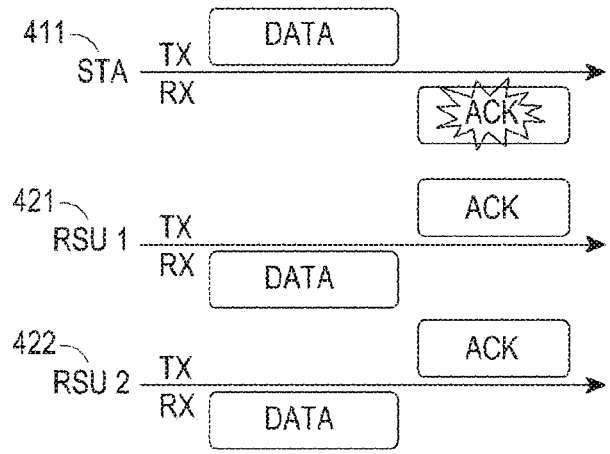

FIG. 4 illustrates a collision issue of an ACK message in a wireless communication system supporting a V2I scheme according to an embodiment of the present disclosure.

Referring to FIG. 4, it will be assumed that the wireless communication system supports a V2I scheme including a plurality of channels and scan time as described above in FIG. 2. In the wireless communication system, as RSU deployment density increases, the handoff count increases.

To prevent degradation of service quality due to a handoff process, the wireless communication system identically sets BSSIDs and frequencies of RSUs, and a handoff does not occur. That is, when RSUs use the same BSSID and the same frequency, even though the RSU is changed, the changed RSU is determined as the same RSU, so a STA does not need to perform a handoff process and a scan operation.

In this case, a plurality of RSUs receive data of a STA, which increases total load of the wireless communication system. Each of the plurality of RSUs transmits an ACK message to the data received from the STA, so collision among the ACK messages may occur.

FIG. 4 illustrates when collision among ACK messages occurs when a STA 411 moves through two RSUs, e.g., RSU 1 421 and RSU 2 422 is illustrated in FIG. 4. That is, RSU 1 421 and RSU 2 422 use the same BSSID and the same frequency, so RSU 1 421 and RSU 2 422 receive (RX) data transmitted by the STA 411 and transmit (TX) an ACK message to the data received from the STA 411 through the same channel.

The ACK messages transmitted by RSU 1 421 and RSU 2 422 through the same channel collide, so the STA 411 may not receive the ACK messages to the transmitted data.

Figure 5:
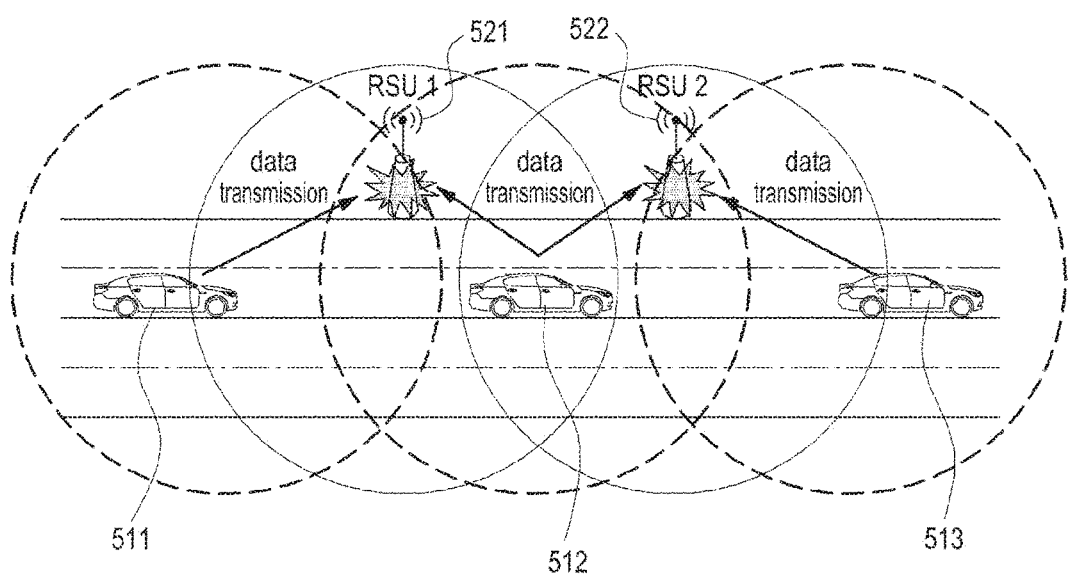
FIG. 5 illustrates a hidden-terminal issue in a wireless communication system supporting a V2I scheme according to an embodiment of the present disclosure.

FIG. 5 illustrates a hidden-terminal issue in a wireless communication system supporting a V2I scheme according to an embodiment of the present disclosure.

Referring to FIG. 5, typical issues which may occur in the wireless communication system supporting the V2I scheme are a hidden-terminal issue and an exposed-terminal issue. The hidden-terminal issue occurs since a STA transmits data to an RSU while another STA transmits data to the RSU. That is, a transmission collision issue which occurs since the STA and the other STA do not exist within a range in which the STA and the other STA may detect a transmission state each other is the hidden-terminal issue. As a service coverage of RSUs which use the same frequency increases, the more serious the hidden-terminal issue becomes. That is, as described in FIG. 4, in the wireless communication system supporting the V2I scheme, a handoff does not occur by setting BSSIDs and frequencies of RSUs the same for preventing service quality degradation due to a handoff process. In this case, the hidden-terminal issue may occur.

For example, in FIG. 5, a hidden-terminal issue may occur since a STA 2 512 transmits data to RSU 1 521 while a STA 1 511 transmits data to RSU 1 521. That is, if STA 1 511 and STA 2 512 do not exist within a range in which STA 1 511 and STA 2 512 may detect transmission each other and STA 1 511 and STA 2 512 transmit data using the same frequency, data transmitted by STA 1 511 and data transmitted by STA 2 512 collide.

In FIG. 5, a hidden-terminal issue may occur since STA 3 513 transmits data to RSU 2 522 while STA 2 512 transmits data to RSU 2 522. That is, if STA 2 512 and STA 3 513 do not exist within a range in which STA 2 512 and STA 3 513 may detect transmission each other and STA 2 512 and STA 3 513 transmit data using the same frequency, data transmitted by STA 2 512 and data transmitted by STA 3 513 collide.

As the number of vehicles which move at a low speed increases, the more serious the above-described hidden-terminal issue becomes.

Figure 6:
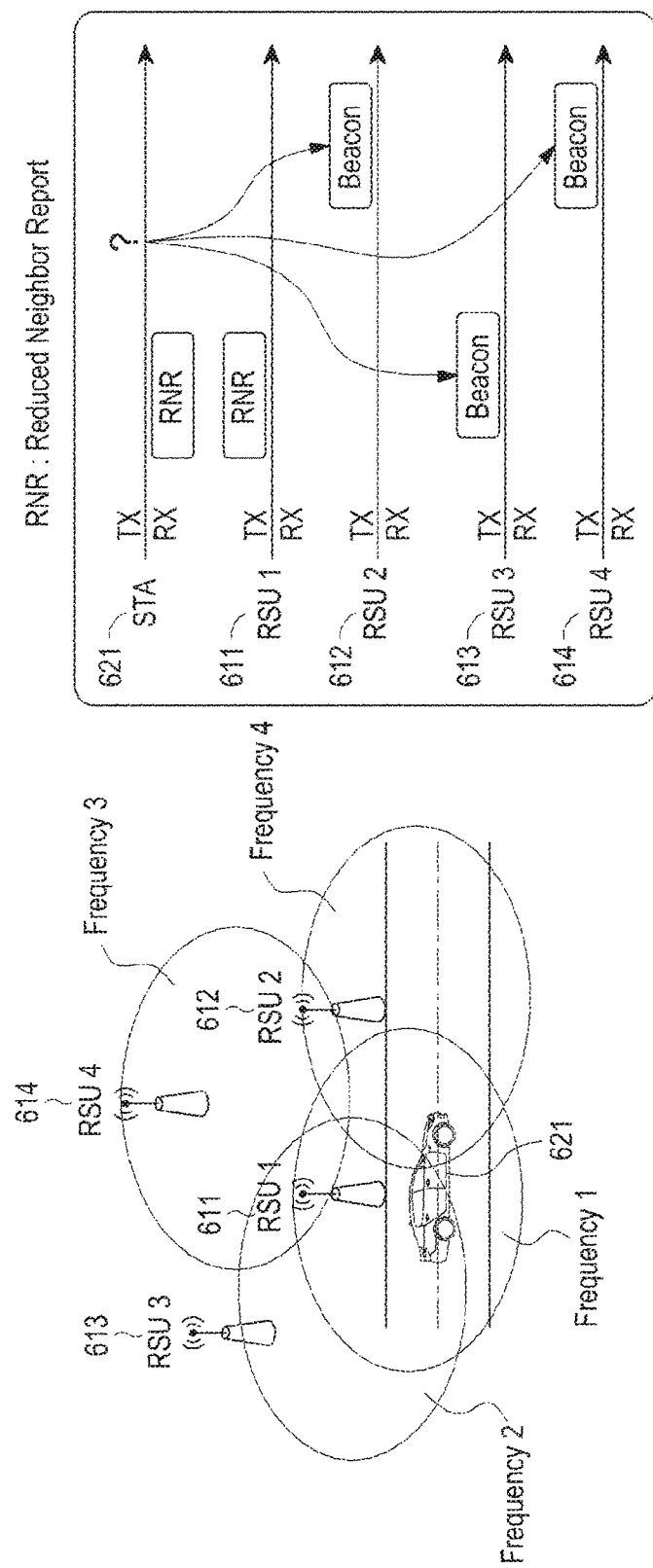
FIG. 6 illustrates another example of a handoff process in a wireless communication system supporting a V2I scheme according to an embodiment of the present disclosure.

FIG. 6 illustrates another example of a handoff process in a wireless communication system supporting a V2I scheme according to an embodiment of the present disclosure.

Referring to FIG. 6, it will be assumed that the wireless communication system supports a V2I scheme which is based on a Wi-Fi scheme supporting a plurality of channels and scan time as described above in FIG. 2.

When a STA performs a handoff process due to a change in RSU, a channel scan time of 2.34 seconds (39×60 ms) is required. In the wireless communication system, if RSU deployment density is increased for enhancing a service coverage, a handoff count is increased. As a speed of a vehicle at which the STA is located increases, the handoff count increases.

So, an embodiment of the present disclosure discloses a handoff process which is based on an IEEE 802.11ai standard.

An AP (or RSU) may decrease a scan time of STAs which have accessed the AP by providing a message including information on neighbor APs of the AP, e.g., a reduced neighbor report (RNR) message, which may be transmitted through at least one of beacon frames, probe response frames, and fast initial link setup (FILS) discovery frames. A beacon frame, a probe response frame, and an FILS discovery frame have been defined in an IEEE 802.11ai standard, and thus, a detailed description thereof will be omitted herein.

The RNR message includes at least one of channel information, beacon timing information and service set identifier (SSID) information for each AP.

Upon receiving the RNR message transmitted by the AP, the STA sets a channel for which an AP that the STA may access exists to a scan target and performs a scan process. So, even though the STA needs to perform handoff processes in the manner of the handoff process in FIG. 2, the STA decreases a time required for performing a scan process to decrease a time required for a handoff process.

Referring to FIG. 6, each of a plurality of APs, i.e., RSU 1 611, RSU 2 612, RSU 3 613, and RSU 614 transmits (TX) an RNR message to a STA 621, which detects neighbor RSU information and channel information for each of RSU 1 611, RSU 2 612, RSU 3 613, and RSU 614. In FIG. 6, it will be assumed that RSU 1 611, RSU 2 612, RSU 3 613, and RSU 4 614 use frequency 1, frequency 4, frequency 2, and frequency 3, respectively.

However, a handoff process using an RNR message which is based on the IEEE 802.11ai standard considers low speed-movement such as a stop and walking, so even though the STA 621 receives (RX) the neighbor RSU information for each of RSU 1 611, RSU 2 612, RSU 3 613, and RSU 4 614, the STA 621 may not select and scan the RSU related to a mobility of the STA 621. That is, the handoff process using the RNR message which is based on the IEEE 802.11ai standard has not disclosed detecting an optimal RSU based on a speed of a vehicle, so a STA which receives an RNR needs to scan all RSUs which correspond to neighbor RSU information included in the RNR message.

In the handoff process using the RNR message which is based on the IEEE 802.11ai standard, a scan process is performed based on a beacon frame, which compromises decreasing a time required for performing a handoff process.

So, an embodiment of the present disclosure discloses decreasing a relatively long handoff time occurred due to a time required for performing a scan process in a STA in a Wi-Fi network environment where RSUs use different BSSIDs and different frequencies, providing RSU location information for effective scan/channel selection, an effective scan scheme, a channel selecting scheme of decreasing a time required for performing a handoff process, solving an ACK message collision issue which may occur when RSUs use the same BSSID and the same frequency, and transmitting an ACK message in a specific RSU among a plurality of RSUs.

That is, an embodiment of the present disclosure discloses providing neighbor RSU information, e.g., channel information of a neighbor RSU, information related to a beacon transmission time, SSID information, RSU location information, providing neighbor RSU information based on a STA request, an effective channel scan scheme, and a channel selecting scheme of decreasing a time required for performing a handoff process in a Wi-Fi network environment where RSUs use different BSSIDs and different frequencies, and determining whether to transmit an ACK message based on location information of a STA and transmitting the ACK message based on the determined result in RSU when RSUs use the same BSSID and the same frequency.

Figures 7, 8:
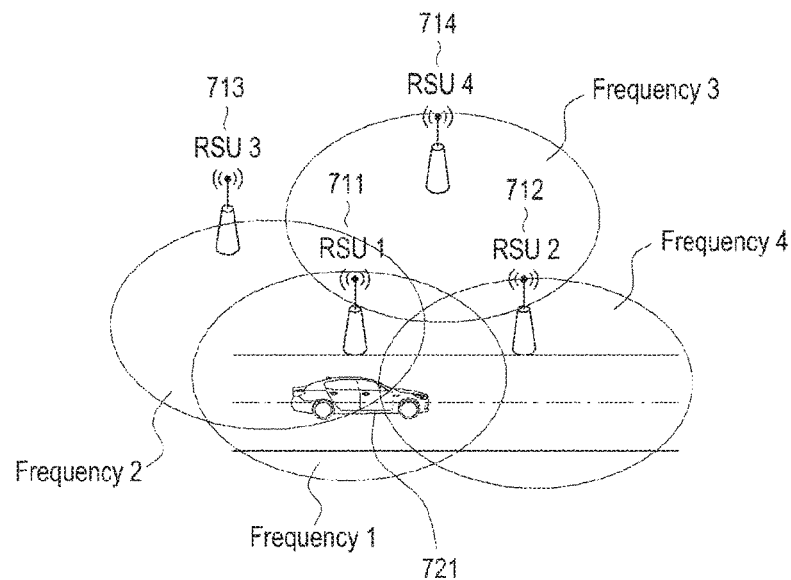
FIG. 7 illustrates a process of providing location information of an RSU and a STA in a wireless communication system supporting a V2I scheme according to an embodiment of the present disclosure.
FIG. 8 illustrates an example of a format of a neighbor RSU information message in a wireless communication system supporting a V2I scheme according to an embodiment of the present disclosure.

FIG. 7 illustrates a process of providing location information of an RSU and a STA in a wireless communication system supporting a V2I scheme according to an embodiment of the present disclosure.

Referring to FIG. 7, each of RSU 1 711, RSU 2 712, RSU 3 713, and RSU 714 transmits a neighbor RSU information message including neighbor RSU information for each of neighbor RSUs. The neighbor RSU information message may be implemented with various formats, one of which will be described below, and a detailed description thereof will be omitted herein.

A STA 721 may receive the neighbor RSU information message transmitted by each of RSU 1 711, RSU 2 712, RSU 3 713, and RSU 4 714 and detect the neighbor RSU information for each of the RSUs. In FIG. 7, it will be assumed that RSU 1 711, RSU 2 712, RSU 3 713, and RSU 4 714 use frequency 1, frequency 4, frequency 2, and frequency 3, respectively.

STA 721 transmits a request message including location information of STA 721. Each of RSU 1 711, RSU 2 712, RSU 3 713, and RSU 714 receives the request message transmitted by the STA 721, and may determine whether to transmit a neighbor RSU information message based on the location information of the STA 721 included in the request message. The request message may be implemented with various formats, one of which will be described below, and a detailed description thereof will be omitted herein.

FIG. 8 illustrates an example of a format of a neighbor RSU information message in a wireless communication system supporting a V2I scheme according to an embodiment of the present disclosure.

Referring to FIG. 8, a neighbor RSU information message includes an element identifier (ID) field, a length field, and n neighbor RSU information fields, i.e., neighbor RSU information field #1, neighbor RSU information field #2, . . . , neighbor RSU information field #n.

The element ID field may be implemented with one octet, and the length field may be implemented with one octet, but the present disclosure is not limited thereto. A size of each of neighbor RSU information field #1, neighbor RSU information field #2, . . . , and neighbor RSU information field #n may vary.

Each of the neighbor RSU information fields includes a location field including value pairs identifying location information of APs, and a size of each of the neighbor RSU information fields may vary. The location field will be described with reference to FIG. 9, and a detailed description thereof will be omitted herein.

Figure 9:
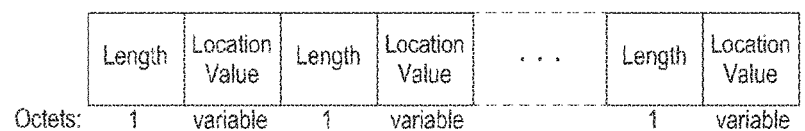
FIG. 9 illustrates an example of a format of a location field included in a neighbor RSU information message or a request message in a wireless communication system supporting a V2I scheme according to an embodiment of the present disclosure.

FIG. 9 illustrates an example of a format of a location field included in a neighbor RSU information message or a request message in a wireless communication system supporting a V2I scheme according to an embodiment of the present disclosure.

Referring to FIG. 9, it will be noted that a format of a location field included in a neighbor RSU information message or a request message in FIG. 9 is a format of a location field included in a neighbor RSU information message or a request message when the wireless communication system supports a V2I scheme which is based on an OCE standard.

A neighbor RSU information message used for transmitting location information of neighbor APs in an AP will be described below.

When the neighbor AP information message includes location information of neighbor APs, a format of the neighbor AP information message may be expressed as shown below in Table 1. For example, the neighbor AP information message may be implemented with a location indication attribute.

TABLE 1

| Field Name | Size (Octets) | Value | Description |
|---|---|---|---|
| Attribute ID | 1 | Specific Decimal # | Identifies the type of OCE attribute. |
| Length | Specific Size | Variable | Length of the following fields in the attribute. |
| Location | Variable | Variable | A field that is a sequence of length and value pairs that identify the locations of APs (AP -> STA). |

As shown in Table 1, the neighbor AP information message includes an attribute ID field, a length field, and a location field.

The attribute ID field is used for identifying a type of an attribute, i.e., an OCE attribute, and may be implemented with one octet. The OCE attribute in Table 1 is a location indication attribute, so it will be identified that the OCE attribute is the location indication attribute through the attribute ID field.

The length field is used for indicating a length of fields after the length field in the attribute, i.e., the OCE attribute, and may be implemented with a specific size.

The location field includes value pairs identifying location information of APs, and a size of the location field may vary. The location field will be described with reference to FIG. 9, and a detailed description thereof will be omitted herein.

If the neighbor AP information message includes at least one of direction information and speed information of a STA as well as location information of neighbor APs, a format of the neighbor AP information message may be expressed as shown below in Table 2. For example, the neighbor AP information message may be implemented with a location/direction/velocity (LDV) indication attribute.

TABLE 2

| Field Name | Size (Octets) | Value | Description |
|---|---|---|---|
| Attribute ID | 1 | Specific Decimal # | Identifies the type of OCE attribute. |
| Length | Specific Size | Variable | Length of the following fields in the attribute. |
| Location | Variable | Variable | A field that is a sequence of length and value pairs that identify the locations of APs. |
| Direction Length | 0 or 1 | Variable | An optional field used if a direction of vehicle is used |
| Direction | Specific Size | Variable | An optional field that is a value to identify the moving direction of vehicle |
| Velocity Length | 0 or 1 | Variable | An optional field used if a velocity of vehicle is used |
| Velocity | Specific Size | Variable | An optional field that is a value to identify the velocity of vehicle |

As shown in Table 2, the neighbor AP information message includes an attribute ID field, a length field, a location field, a direction length field, a direction field, a speed length field, and a speed field.

The attribute ID field is used for identifying a type of an attribute, i.e., an OCE attribute, and may be implemented with one octet. The OCE attribute in Table 2 is an LDV indication attribute, so it will be identified that the OCE attribute is the LDV indication attribute through the attribute ID field.

The length field is used for indicating a length of fields after the length field in the attribute, i.e., the OCE attribute, and may be implemented with a specific size.

The location field includes value pairs identifying location information of APs, and a size of the location field may vary. The location field will be described with reference to FIG. 9, and a detailed description thereof will be omitted herein.

The direction length field is included in the neighbor AP information message if direction information indicating a direction of a STA which is mounted on located at the vehicle is used. The direction length field is an optional field, and a value of the direction length field may be zero (0) or 1 octet.

The direction field is used for indicating a value identifying a moving direction of the STA. The direction field may be implemented with a specific size, and the direction field is an optional field.

The speed length field is included in the neighbor AP information message if speed information indicating a speed of the STA is used, is an optional field, and may have a value of 0 or 1 octet.

The speed field is used for indicating a value identifying a speed of the STA, may be implemented with a specific size, and is an optional field.

A format of a request message used for a STA to transmit location information of the STA will be described below.

If the request message includes location information of the STA, a format of the request message may be expressed as shown below in Table 3. For example, the request message may be implemented with a location indication attribute.

TABLE 3

| Field Name | Size (Octets) | Value | Description |
|---|---|---|---|
| Attribute ID | 1 | Specific Decimal # | Identifies the type of OCE attribute. |
| Length | Specific Size | Variable | Length of the following fields in the attribute. |
| Location | Variable | Variable | A field that is a sequence of length and a value pair that identifies the location of vehicle (STA -> AP). |

As shown in Table 3, the request message includes an attribute ID field, a length field, and a location field.

The attribute ID field is used for identifying a type of an attribute, i.e., an OCE attribute, and may be implemented with one octet. The OCE attribute in Table 3 is a location indication attribute, so it will be identified that the OCE attribute is the location indication attribute through the attribute ID field.

The length field is used for indicating a length of fields after the length field in the OCE attribute, and may be implemented with a specific size.

The location field includes a value pair identifying location information of a STA, and a size of the location field may vary. The location field will be described with reference to FIG. 9, and a detailed description thereof will be omitted herein.

If the request message includes at least one of location information, direction information, and speed information of a STA, a format of the request message may be expressed as shown below in Table 4. For example, the request message may be implemented with an LDV indication attribute.

TABLE 4

| Field Name | Size (Octets) | Value | Description |
| --- | --- | --- | --- |
| Attribute ID | 1 | Specific Decimal # | Identifies the type of OCE attribute. |
| Length | Specific Size | Variable | Length of the following fields in the attribute. |
| Location | Variable | Variable | A field that is a sequence of length and a value pair that identifies the location of vehicle. |
| Direction Length | 0 or 1 | Variable | An optional field used if a direction of vehicle is used |
| Direction | Specific Size | Variable | An optional field that is a value to identify the moving direction of vehicle |
| Velocity Length | 0 or 1 | Variable | An optional field used if a velocity of vehicle is used |
| Velocity | Specific Size | Variable | An optional field that is a value to identify the velocity of vehicle |

As shown in Table 4, the request message includes an attribute ID field, a length field, a location field, a direction length field, a direction field, a speed length field, and a speed field.

The attribute ID field is used for identifying a type of an attribute, i.e., an OCE attribute, and may be implemented with one octet. The OCE attribute in Table 4 is an LDV indication attribute, so it will be identified that the OCE attribute is the LDV indication attribute through the attribute ID field.

The length field is used for indicating a length of fields after the length field in the OCE attribute, and may be implemented with a specific size.

The location field includes a value pair identifying location information of a STA, and a size of the location field may vary. The location field will be described with reference to FIG. 9, and a detailed description thereof will be omitted herein.

The direction length field is included in the request message if direction information indicating a direction of a STA which is mounted on a vehicle or located at the vehicle is used. The direction length field is an optional field, and has a value of 0 or 1 octet.

The direction field is used for indicating a value identifying a moving direction of the STA, may be implemented with a specific size, and is an optional field.

The speed length field is included in the request message if speed information indicating a speed of the STA is used. The speed length field is an optional field, and has a value of 0 or 1 octet.

The speed field is used for indicating a value identifying a speed of the STA, may be implemented with a specific size, and is an optional field.

A format of a location field included in a neighbor AP information message or a request message will be described with reference to FIG. 9.

The location field may include at least one value pair including a length sub-field and a location value sub-field.

The length sub-field is be implemented with one octet and indicates length of a sub-field after the length sub-field.

A size of the location value sub-field may vary. The location value sub-field may include at least one of latitude information and longitude information. If the location value sub-field includes both the latitude information and the longitude information, the location value sub-field may be implemented with a format including a sub-field which corresponds to the latitude information and a sub-field which corresponds to the longitude information.

Figure 10:
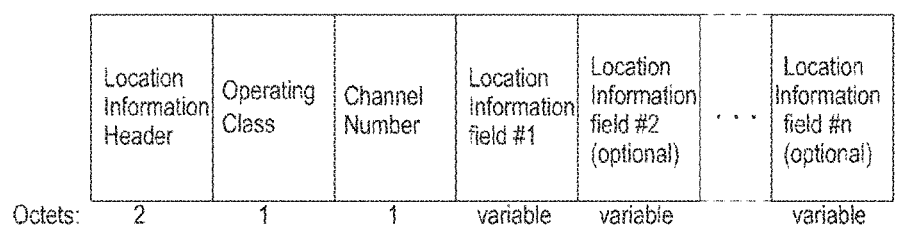
FIG. 10 illustrates another example of a format of a neighbor RSU information message in a wireless communication system supporting a V2I scheme according to an embodiment of the present disclosure.

FIG. 10 illustrates another example of a format of a neighbor RSU information message in a wireless communication system supporting a V2I scheme according to an embodiment of the present disclosure.

Referring to FIG. 10, it will be noted that a format of a neighbor RSU information message in FIG. 10 is a neighbor AP information message when the wireless communication system supports a V2I scheme which is based on an IEEE 802.11ai standard.

In FIG. 10, it will be understood that a neighbor AP information message is implemented with a format which is generated by modifying an RNR message used in the IEEE 802.11ai standard, i.e., an RNR element. However, the neighbor AP information message may be implemented with another element, such as a location field format.

The neighbor AP information message includes a location information header field, an operating class field, a channel number field, and location information field #1 to location information field #n.

The location information header field may be implemented with 2 octets, and includes a count and location information of location information field #1 to location information field #n. The location information header field will be described with reference to FIG. 10, and a detailed description thereof will be omitted herein.

The operating class field may be implemented with 1 octet, and is used for indicating a band and a bandwidth of a channel of an AP which corresponds to each of location information field #1 to location information field #n.

The channel number field may be implemented with 1 octet, and is used for indicating a last known primary channel of the AP which corresponds to each of location information field #1 to location information field #n.

Each of location information field #1 to location information field #n is used for indicating location information of a neighbor AP which operates on a channel, and each will be described with reference to FIG. 12. A detailed description thereof will be omitted herein.

Figure 11:
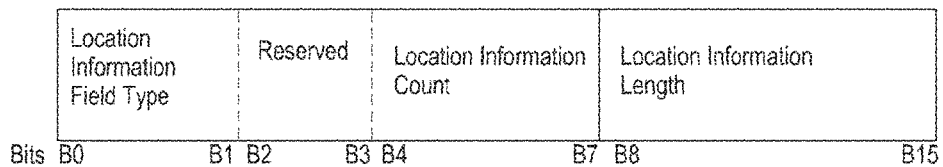
FIG. 11 illustrates a format of a location information header field included in a neighbor RSU information message in a wireless communication system supporting a V2I scheme according to an embodiment of the present disclosure.

FIG. 11 illustrates a format of a location information header field included in a neighbor RSU information message in a wireless communication system supporting a V2I scheme according to an embodiment of the present disclosure.

Referring to FIG. 11, it will be noted that a format of a location information header field is a location field format as described in FIG. 10.

In FIG. 11, the location information header field includes location information field type sub-field, a reserved sub-field, a location information count sub-field, and a location information length sub-field.

The location information field type sub-field may be implemented with 2 bits, but is not limited thereto. If a value of the location information field type sub-field is 0 (zero), the location information field type sub-field defines a structure of the location information field. Other values, e.g., 1, 2, and 3 are reserved for future use.

The reserved sub-field may be implemented with 2 bits, and is reserved for future use.

The location information count sub-field may be implemented with 4 bits, and indicates a value obtained by subtracting 1 from the number of location information fields included in the neighbor AP information message. If a value of the location information count sub-field is 0, it is indicated that one location information field exists.

The location information length sub-field may be implemented with 1 octet and indicates length, e.g., octet length of each of location information fields included in the neighbor AP information message.

FIG. 12 illustrates an example of a format of a location information field included in a neighbor RSU information message in a wireless communication system supporting a V2I scheme according to an embodiment of the present disclosure.

Referring to FIG. 12, it will be noted that a format of a location information field in FIG. 12 is a location field format as described in FIG. 10.

In FIG. 12, the location information field includes a location sub-field, a BSSID sub-field, and a short-SSID sub-field.

A size of the location sub-field may vary, and the location sub-field includes location information of an AP. The location information of the AP may include at least one of latitude information and longitude information.

The BSSID sub-field indicates a BSSID of the AP, and may be included in the location information field if necessary. If the BSSID sub-field is included in the location information field, the BSSID sub-field may be implemented with 6 octets. In FIG. 12, "0 or 6 octets" means that a length of the BSSID sub-field is 6 octets if the BSSID sub-field is included in the location information field, and that the length of the BSSID sub-field is 0 octets, that is, the BSSID sub-field is not present, if the BSSID sub-field is not included in the location information field.

The short-SSID sub-field indicates a short-SSID of the AP, and may be included in the location information field if necessary. If the short-SSID sub-field is included in the location information field, the short-SSID sub-field may be implemented with 4 octets. In FIG. 12, "0 or 4 octets" means that a length of the short-SSID sub-field is 4 octets if the short-SSID sub-field is included in the location information field, and that the length of the short-SSID sub-field is 0 octets, that is, the short-SSID sub-field is not present, if the short-SSID sub-field is not included in the location information field.

FIG. 13 illustrates another example of a format of a location information field included in a neighbor RSU information message in a wireless communication system supporting a V2I scheme according to an embodiment of the present disclosure.

Referring to FIG. 13, it will be noted that a format of a location information field is a location field format as described in FIG. 10.

In FIG. 13, the location information field includes a location/latitude sub-field, a location/longitude sub-field, a BSSID sub-field, and a short-SSID sub-field.

A size of the location/latitude sub-field may be 4 octets but is not limited thereto, and the location/latitude sub-field includes latitude information of an AP.

A size of the location/longitude sub-field may be 4 octets but is not limited thereto, and the location/longitude sub-field includes longitude information of the AP.

The BSSID sub-field indicates a BSSID of the AP, and may be included in the location information field if necessary. If the BSSID sub-field is included in the location information field, the BSSID sub-field may be implemented with 6 octets. In FIG. 13, "0 or 6 octets" means that a length of the BSSID sub-field is 6 octets if the BSSID sub-field is included in the location information field, and that the length of the BSSID sub-field is 0 octet, that is, the BSSID sub-field is not present, if the BSSID sub-field is not included in the location information field.

The short-SSID sub-field indicates a short-SSID of the AP, and may be included in the location information field if necessary. If the short-SSID sub-field is included in the location information field, the short-SSID sub-field may be implemented with 4 octets. In FIG. 13, "0 or 4 octets" means that a length of the short-SSID sub-field is 4 octets if the short-SSID sub-field is included in the location information field, and that the length of the short-SSID sub-field is 0 octet, that is, the short-SSID sub-field is not present, if the short-SSID sub-field is not included in the location information field.

FIG. 14 illustrates an example of a format of a neighbor AP information request message in a wireless communication system supporting a V2I scheme according to an embodiment of the present disclosure.

Referring to FIG. 14, it will be noted that a format of a neighbor AP information request message is a neighbor AP information request message when the wireless communication system supports a V2I scheme which is based on an IEEE 802.11ai standard.

In FIG. 14, the neighbor AP information request message includes an element ID field, a length field, a location field, a direction field, a velocity field, and an optional information filed.

The element ID field may be implemented with one octet, and may include an ID indicating that a corresponding element is for requesting neighbor AP information.

The length field indicates length of fields after the length field, and is implemented with one octet.

A size of the location field may vary, and the location field indicates location information of a STA.

A size of the direction field may vary, and the direction field indicates a moving direction of the STA and is an optional field.

A size of the velocity field may vary, and the velocity field indicates a speed of the STA and is an optional field.

A size of the optional field may vary, and the optional field may include other information. A detailed description of information included in the optional field will be omitted herein.

Figure 15:
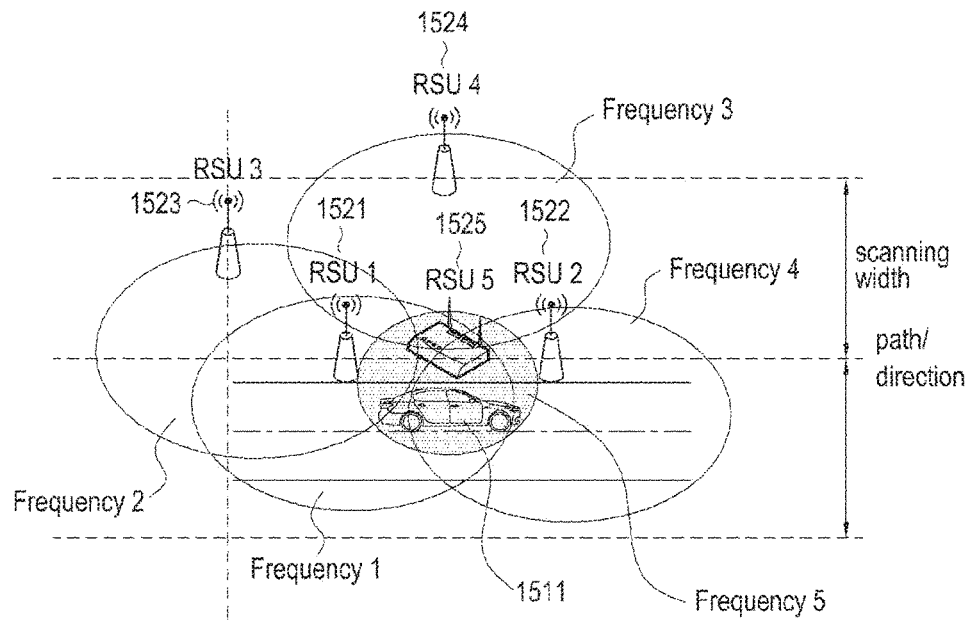
FIG. 15 illustrates an example of a process of performing a scan process in a STA in a wireless communication system supporting a V2I scheme according to an embodiment of the present disclosure.
Figure 15:
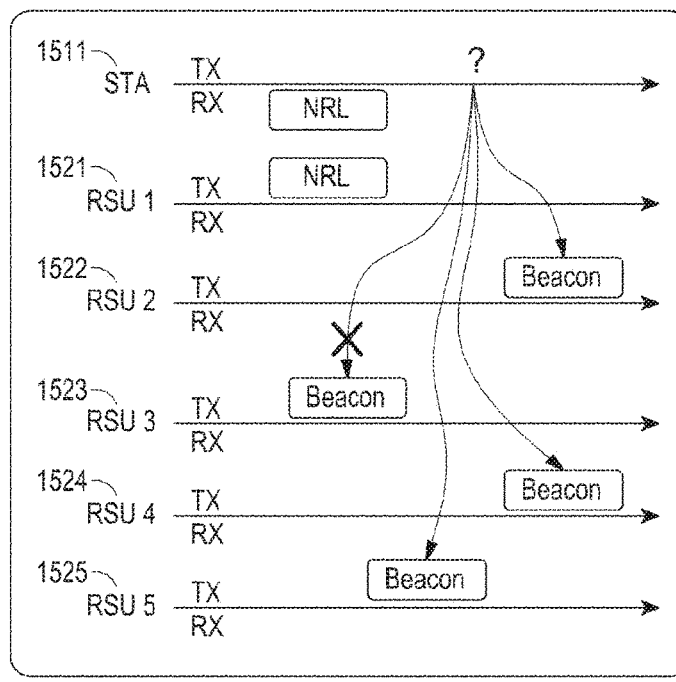

FIG. 15 illustrates an example of a process of performing a scan process in a STA in a wireless communication system supporting a V2I scheme according to an embodiment of the present disclosure.

Referring to FIG. 15, a STA 1511 receives a neighbor RSU information message from each of RSU 1 1521, RSU 2 1522, RSU 3 1523, RSU 4 1524, and RSU 5 1525, wherein each RSU transmits (TX) a neighbor RSU information message including location information (for example, a neighbor report for location (NRL)) for neighbor RSUs of each RSU.

It will be assumed that RSU 1 1521, RSU 2 1522, RSU 3 1523, RSU 4 1524, and RSU 5 1525 use frequency 1, frequency 4, frequency 2, frequency 3, and frequency 5, respectively.

A range of information on neighbor RSUs which each of RSU 1 1521, RSU 2 1522, RSU 3 1523, RSU 4 1524, and RSU 5 1525 includes in the neighbor RSU information, i.e., a range of neighbor RSUs of which location information is included in the neighbor RSU information message, may be determined based on various parameters. For example, RSUs of which the location information is included in the neighbor RSU information message may be located within a preset distance from the RSU which transmits the neighbor RSU information message. The neighbor RSU information message has been described above, and a detailed description thereof will be omitted herein.

STA 1511 may select the RSU and a channel to be scanned by STA 1511 based on a neighbor RSU information message received from each of RSU 1 1521, RSU 2 1522, RSU 3 1523, RSU 4 1524, and RSU 5 1525. That is, STA 1511 may select the RSU and the channel to be scanned by STA 1511 based on location information of neighbor RSUs included in the neighbor RSU information message received from each of RSU 1 1521, RSU 2 1522, RSU 3 1523, RSU 4 1524, and RSU 5 1525.

Selecting an RSU and a channel to be scanned by STA 1511 may be implemented with various forms. For example, STA 1511 may select RSUs which are located within a distance estimated to have good channel quality, i.e., a distance estimated to satisfy a channel quality threshold value as RSUs to be scanned by STA 1511. Channel quality may be expressed as various forms, such as received signal code power (RSCP), reference signal received power (RSRP), a reference signal strength indicator (RSSI), reference signal received quality (RSRQ), a carrier-to-interference noise ratio (CINR), a signal-to-noise ratio (SNR), and a block error rate (BLER). In an embodiment of the present disclosure, it will be assumed that an RSSI is used as channel quality, so the channel quality threshold value may be an RSSI threshold value determined based on various parameters, and the same RSSI threshold value or a different RSSI threshold value may be set for each RSU.

STA 1511 selects RSUs which are located within the distance estimated to satisfy the RSSI threshold value as RSUs to be scanned by STA 1511 because that a time required for performing a handoff process increases if an RSSI of a specific RSU does not satisfy the RSSI threshold value.

In FIG. 15, STA 1511 may acquire location information for each of RSU 2 1522, RSU 3 1523, RSU 4 1524, and RSU 5 1525 based on a neighbor RSU information message received from RSU 1 1521, and determine RSU 2 1522, RSU 4 1524, and RSU 5 1525 among RSU 2 1522, RSU 3 1523, RSU 4 1524, and RSU 5 1525 as RSUs to be scanned.

Figure 16:
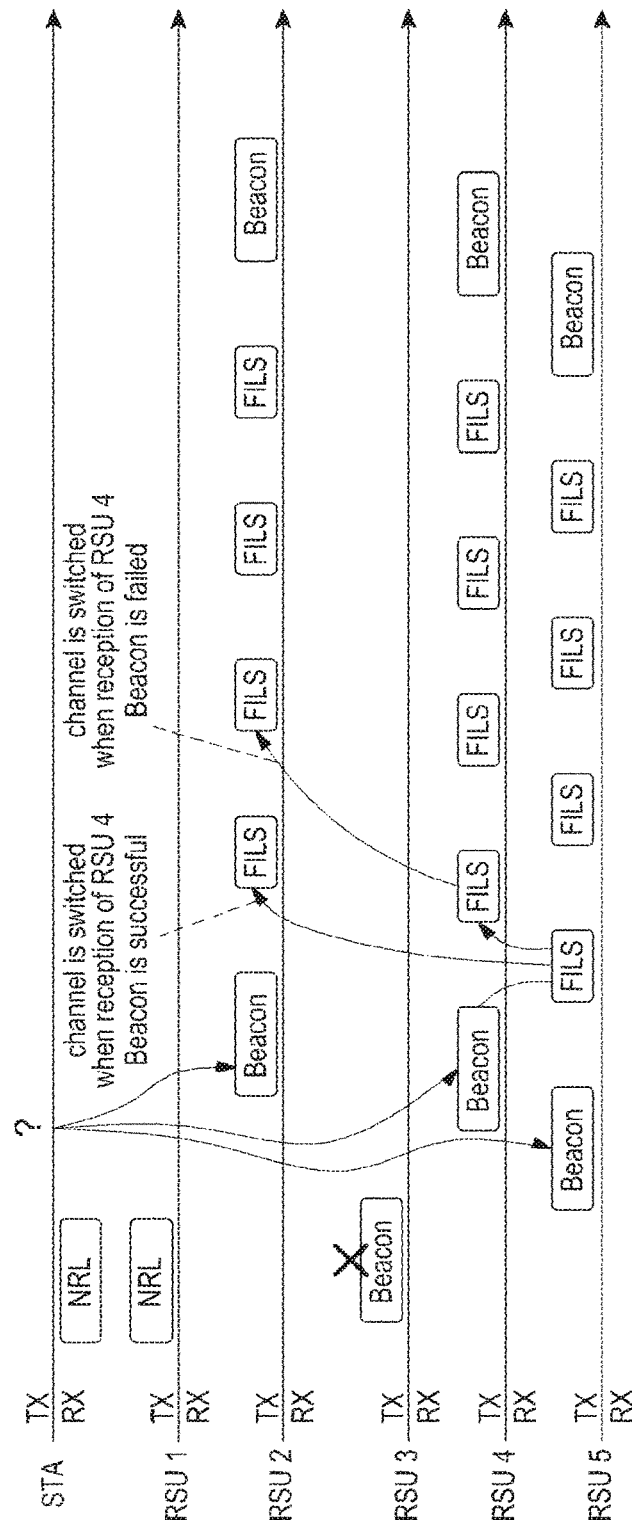
FIG. 16 illustrates another example of a process of performing a scan process in a STA in a wireless communication system supporting a V2I scheme according to an embodiment of the present disclosure.

FIG. 16 illustrates another example of a process of performing a scan process in a STA in a wireless communication system supporting a V2I scheme according to an embodiment of the present disclosure.

Referring to FIG. 16, it will be assumed that a STA receives a neighbor RSU information message from RSU 1. The neighbor RSU information message has been described above, and a detailed description thereof will be omitted herein. It will be assumed that RSU 1 transmits the neighbor RSU message including location information of each of RSU 2, RSU 3, RSU 4, and RSU 5. That is, it will be assumed that RSU 2, RSU 3, RSU 4, and RSU 5 are neighbor RSUs for RSU 1.

The STA may select the RSU and a channel to be scanned based on the neighbor RSU information message received from RSU 1 and location information, a moving direction, and a moving path of the STA. In FIG. 16, it will be assumed that the STA selects RSU 2, RSU 4, and RSU 5 as RSU to be scanned. For example, the STA selects RSUs which are located within a distance estimated to satisfy an RSSI threshold value as RSUs to be scanned by the STA. Alternatively, the STA may perform a scan process for all RSUs included in the neighbor RSU information, or sequentially perform a scan process from the RSU closest in distance to the STA.

Unless additional information is provided beforehand, the STA needs to receive a beacon frame and a FILS discovery frame for transmitting a probe request frame as soon as possible after selecting the channel to be scanned.

The STA may minimize a time required for a handoff through a scheduling process in which the STA is switched to a channel on which a scan process will be performed before transmitting the beacon frame and the FILS discovery frame based on information on timing at which the beacon frame is transmitted and the STA will switch the channel.

If an RSSI estimation value which is based on the location information of the STA and the location information of the neighbor RSUs is less than an RSSI threshold value when the scheduling process in which the channel is switched is performed, the STA may perform a scheduling process after excluding a channel of which an RSSI estimation value is less than the RSSI threshold value.

Figure 17:
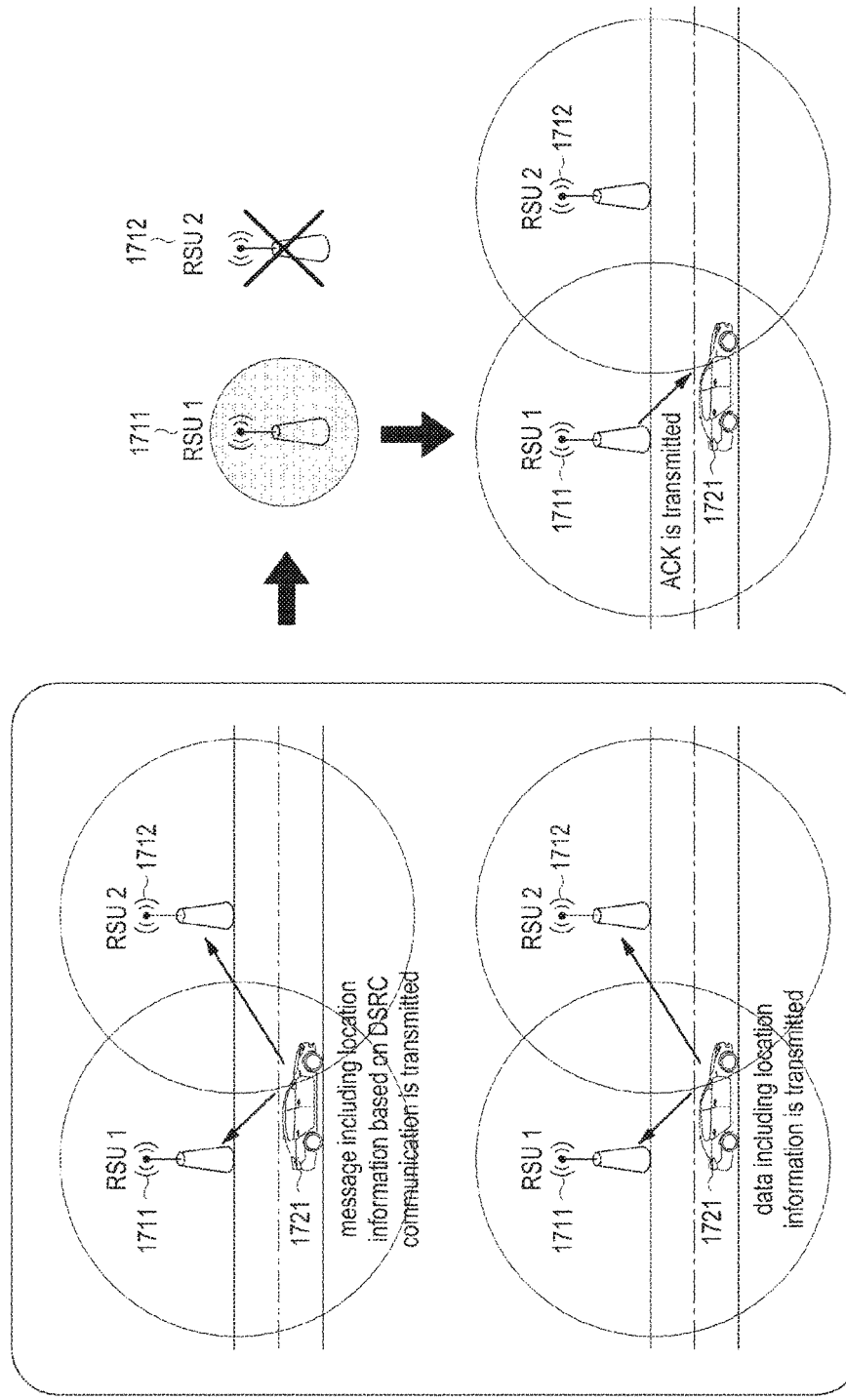
FIG. 17 illustrates a process of transmitting an ACK message in an RSU in a wireless communication system supporting a V2I scheme according to an embodiment of the present disclosure.

FIG. 17 illustrates a process of transmitting an ACK message in an RSU in a wireless communication system supporting a V2I scheme according to an embodiment of the present disclosure.

Referring to FIG. 17, RSU 1 1711 and RSU 2 1712 receive a message or data transmitted by a STA 1721, and may detect location of STA 1721 based on location information included in the message transmitted by STA 1721, e.g., a safety message including location information which is based on a dedicated short-range communication (DSRC) or the data transmitted by STA 1721.

Each of RSU 1 1711 and RSU 2 1712 may determine whether to transmit an ACK message for the safety message or the data received from STA 1721 based on the location of STA 1721. For example, each of RSU 1 1711 and RSU 2 1712 detects a distance between STA 1721 and each of RSU 1 1711 and RSU 2 1712 based on the location of STA 1721.

Each of RSU 1 1711 and RSU 2 1712 determines whether the detected distance between STA 1721 and each of RSU 1 1711 and RSU 2 1712 is greater than a threshold distance. If the detected distance is greater than the threshold distance, a corresponding RSU does not transmit an ACK message to the received safety message or data.

In FIG. 17, it will be assumed that a distance between RSU 2 1712 and STA 1721 is greater than the threshold distance, so RSU 2 1712 does not transmit an ACK message to the received safety message or data to STA 1721.

It will be assumed that a distance between RSU 1 1711 and STA 1721 is less than or equal to the threshold distance, so RSU 1 1711 transmits an ACK message to the received safety message or data to STA 1721.

In FIG. 17, it will be assumed that there is one RSU which is located within the threshold distance from STA 1721. However, if there are a plurality of RSUs which are located within the threshold distance from STA 1721, RSU closest to STA 1721 among the plurality of RSUs may transmit an ACK message to the received safety message or data to STA 1721. Specific RSUs may know location information of the specific RSUs in advance through Subnet/Proximity/Profile.

Figure 18:
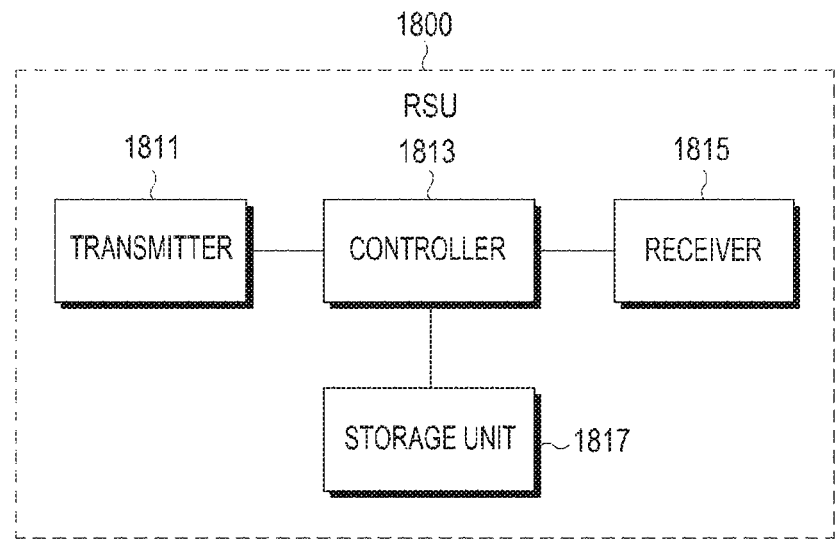
FIG. 18 illustrates an inner structure of an RSU in a wireless communication system supporting a V2I scheme according to an embodiment of the present disclosure.

FIG. 18 illustrates an inner structure of RSU in a wireless communication system supporting a V2I scheme according to an embodiment of the present disclosure.

Referring to FIG. 18, RSU 1800 includes a transmitter 1811, a controller 1813, a receiver 1815, and a storage unit 1817.

The controller 1813 controls the overall operation of RSU 1800. More particularly, the controller 1813 controls an operation related to performing a handoff process and transmitting an ACK message in the wireless communication system supporting the V2I scheme, as described above with reference to FIGS. 2 to 17. Thus, a detailed description thereof will be omitted herein.

The transmitter 1811 transmits various signals and messages to other devices, e.g., other RSUs, a STA, or a server included in the wireless communication system under a control of the controller 1813.

The receiver 1815 receives various signals and various messages from other devices, e.g., other RSUs, a STA, or a server included in the wireless communication under a control of the controller 1813. The various transmitted and received signals and messages have been described above, and a detailed description thereof will be omitted herein.

The storage unit 1817 stores various programs, various data related to the operation of providing the service in the wireless communication system supporting the V2I scheme, e.g., the operation of performing the handoff process and transmitting the ACK message performed in RSU 1800 under a control of the controller 1813.

The storage unit 1817 stores various signals and various messages which are received by the receiver 1815 from the other devices.

While the transmitter 1811, the controller 1813, the receiver 1815, and the storage unit 1817 are described in RSU 1800 as separate units, it is to be understood that this is merely for convenience of description, and two or more of the transmitter 1811, the controller 1813, the receiver 1815, and the storage unit 1817 may be incorporated into a single unit.

RSU 1800 may be implemented with at least one processor.

Figure 19:
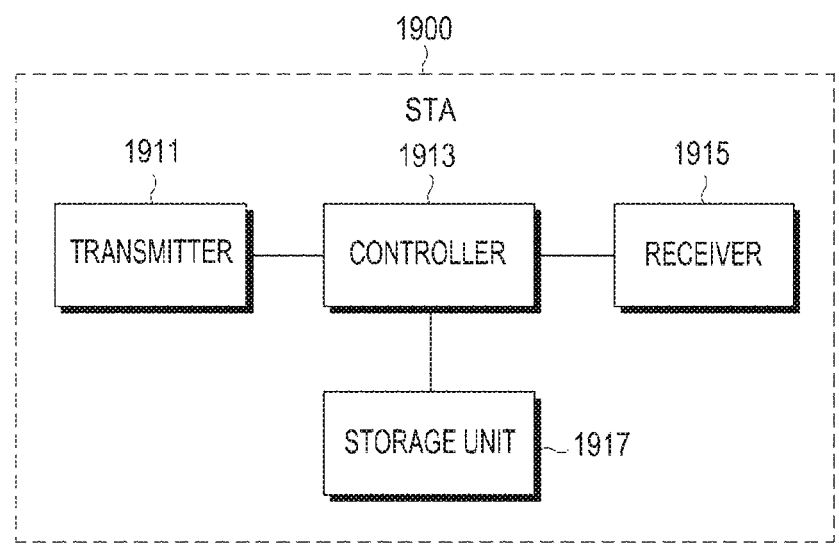
FIG. 19 illustrates an inner structure of a STA in a wireless communication system supporting a V2I scheme according to an embodiment of the present disclosure.

FIG. 19 illustrates an inner structure of a STA in a wireless communication system supporting a V2I scheme according to an embodiment of the present disclosure.

Referring to FIG. 19, a STA 1900 includes a transmitter 1911, a controller 1913, a receiver 1915, and a storage unit 1917.

The controller 1913 controls the overall operation of STA 1900. More particularly, the controller 1913 controls an operation related to performing a handoff process and transmitting an ACK message, as described with reference to FIGS. 2 to 17. Thus, a detailed description thereof will be omitted herein.

The transmitter 1911 transmits various signals and various messages to other devices, e.g., other STAs or RSU included in the wireless communication system under a control of the controller 1913.

The receiver 1915 receives various signals and various messages from other devices, e.g., other STAs or RSU included in the wireless communication under a control of the controller 1913. The various signals and messages transmitted and received in the receiver 1915 have been described above with reference to FIGS. 2 to 17, and a detailed description thereof will be omitted herein.

The storage unit 1917 stores various programs, various data related to performing the handoff process and transmitting the ACK message performed in STA 1900 under a control of the controller 1913.

The storage unit 1917 stores various signals and various messages which are received by the receiver 1915 from the other devices.

While the transmitter 1911, the controller 1913, the receiver 1915, and the storage unit 1917 are described in STA 1900 as separate units, it is to be understood that this is merely for convenience of description. In other words, two or more of the transmitter 1911, the controller 1913, the receiver 1915, and the storage unit 1917 may be incorporated into a single unit.

STA 1900 may be implemented with at least one processor.

In accordance with an aspect of the present disclosure, an operating method of an AP in a wireless communication system supporting a V2I scheme includes generating a neighbor AP information message including location information of each of neighbor APs, and transmitting the neighbor AP information message, wherein the neighbor AP information message includes a field indicating that a type of a currently transmitted message includes location information, a length field indicating a length of fields located after the length field in the currently transmitted message, and a location information field indicating location information of each of the neighbor APs.

The location information field includes a location value sub-field including at least one of latitude information and longitude information of one of the neighbor APs, and a length sub-field indicating a length of a sub-field located after the length sub-field.

In accordance with an aspect of the present disclosure, an operating method of a STA in a wireless communication system supporting a V2I scheme includes generating a neighbor AP information request message including location information of the STA, and transmitting the neighbor AP information request message to an AP, wherein the neighbor AP information request message includes a field indicating that a type of a currently transmitted message includes location information, a length field indicating a length of fields located after the length field in the currently transmitted message, and a location information field indicating location information of the STA.

The location information field includes a length sub-field indicating a length of a sub-field located after the length sub-field, and a location value sub-field including at least one of latitude information and longitude information of the STA.

The neighbor AP information request message further includes at least one of direction information indicating a moving direction of the STA and speed information indicating a speed of the STA.

In accordance with an aspect of the present disclosure, an operating method of an AP in a wireless communication system supporting a V2I scheme includes generating a neighbor AP information message including location information of each of neighbor APs, and transmitting the neighbor AP information message, wherein the neighbor AP information message includes a location information header field and location information fields indicating location information of the neighbor APs, and wherein the location information header field includes information related to a number of the location information fields and a length of each of the location information fields.

The neighbor AP information message further includes an operating class field indicating a channel band and a bandwidth of each of the neighbor APs and a channel number field indicating a last known primary channel of each of the neighbor APs.

Each of the location information fields includes a location sub-field including at least one of latitude information and longitude information of one of the neighbor APs further includes, at least one of a BSSID sub-field indicating a BSSID of one of the neighbor APs, and a short-SSID field indicating a short-SSID of the AP, a location/latitude sub-field indicating latitude information of one of the neighbor APs, and a location/longitude sub-field indicating longitude information of the AP further includes, and at least one of a BSSID sub-field indicating a BSSID of one of the neighbor APs, and a short-SSID field indicating a short-SSID of the AP.

The information related to the number of the location information fields indicates a value obtained by subtracting a preset value from the number of the location information fields.

In accordance with still another aspect of the present disclosure, an operating method of a STA in a wireless communication system supporting a V2I scheme includes generating a neighbor AP information request message including location information of the STA, and transmitting the neighbor AP information request message to an AP, wherein the neighbor AP information request message includes an identifier indicating that a currently transmitted message requests neighbor AP information, a length field indicating a length of fields located after the length field in the currently transmitted message, and a location information field indicating location information of the STA.

The location information field includes at least one of latitude information and longitude information of the STA.

The neighbor AP information request message further includes at least one of direction information indicating a moving direction of the STA and speed information indicating a speed of the STA.

In accordance with still another aspect of the present disclosure, an operating method of a STA in a wireless communication system supporting a V2I scheme includes receiving a neighbor AP information message including location information of neighbor APs from an AP, selecting neighbor APs to be scanned by the STA among the neighbor APs based on the location information of the neighbor APs, and performing a scan process on the selected neighbor APs, wherein the neighbor AP information message includes a field indicating that a type of a currently transmitted message includes location information, a length field indicating a length of fields located after the length field in the currently transmitted message, and a location information field indicating location information of each of the neighbor APs.

The location information field includes a location value sub-field including at least one of latitude information and longitude information of one of the neighbor APs, and a length sub-field indicating a length of a sub-field located after the length sub-field.

The operating method further includes transmitting a neighbor AP information request message to the AP, and the neighbor AP information request message includes a field indicating that a type of a currently transmitted message includes location information, a length field indicating a length of fields located after the length field in the currently transmitted message, and a location information field indicating location information of the STA.

As is apparent from the foregoing description, embodiments of the present disclosure provide a service in a wireless communication system supporting a V2I scheme for performing an effective handoff, decreasing a handoff frequency, decreasing a time required for a handoff, and decreasing collision among ACK messages when a plurality of RSUs use the same BSSID.

Embodiments of the present disclosure further provide a service in a wireless communication system supporting a V2I scheme based on at least one of location information of at least one RSU and location information of a vehicle, and for decreasing RSUs to be scanned.

Aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and data transmission through the Internet. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage including but not limited to an erasable or re-writable ROM, a memory a RAM, a memory chip, a memory device, or a memory integrated circuit (IC), or an optically or magnetically recordable non-transitory machine-readable or computer-readable storage medium, such as a compact disk (CD), a digital video disc (DVD), a magnetic disk, or a magnetic tape. A method and apparatus according to an embodiment of the present disclosure may be implemented by a computer or a mobile terminal that includes a controller and a memory, and the memory may be an example of a non-transitory machine-readable or computer-readable storage medium suitable to store a program or programs including instructions for implementing embodiments of the present disclosure.

The present disclosure may include a program including code for implementing the apparatus and method as defined by the appended claims, and a non-transitory machine-readable or computer-readable storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to embodiments thereof, it will be understood by those skilled in the art that various changes in form and details may be made therein without departing from the spirit and scope of the present disclosure as defined by the appended claims and their equivalents.

What is claimed is:

1. An access point (AP) in a wireless communication system supporting a vehicle to infrastructure (V2I) scheme, the AP comprising:
    a controller configured to generate a neighbor AP information message including location information of each of neighbor APs; and
    a transmitter configured to transmit the neighbor AP information message, wherein the neighbor AP information message includes a location information header field and location information fields indicating location information of the neighbor APs, and wherein the location information header field includes information related to a number of the location information fields and a length of each of the location information fields.

2. The AP of claim 1, wherein the neighbor AP information message further includes an operating class field indicating a channel band and a bandwidth of each of the neighbor APs and a channel number field indicating a last known primary channel of each of the neighbor APs.

3. The AP of claim 1, wherein each of the location information fields includes a location sub-field including at least one of latitude information and longitude information of one of the neighbor APs.

4. The AP of claim 3, wherein each of the location information fields further includes at least one of a basic service set identifier (BSSID) sub-field indicating a BSSID of one of the neighbor APs, and a short-service set identifier (short-SSID) field indicating a short-SSID of the AP.

5. The AP of claim 1, wherein each of the location information fields includes a location/latitude sub-field indicating latitude information of one of the neighbor APs, and a location/longitude sub-field indicating longitude information of the AP.

6. The AP of claim 5, wherein each of the location information fields further includes at least one of a basic service set identifier (BSSID) sub-field indicating a BSSID of one of the neighbor APs, and a short-service set identifier (short-SSID) field indicating a short-SSID of the AP.

7. The AP of claim 1, wherein the information related to the number of the location information fields indicates a value obtained by subtracting a preset value from the number of the location information fields.

* * * * *